United States Patent
An et al.

(10) Patent No.: US 7,729,965 B1
(45) Date of Patent: Jun. 1, 2010

(54) COLLATERAL VALUATION CONFIDENCE SCORING SYSTEM

(75) Inventors: Mark Y. An, North Potomac, MD (US); Andre H. Gao, Columbia, MD (US)

(73) Assignee: Fannie Mae, Washington, DC (US)

( * ) Notice: Subject to any disclaimer, the term of this patent is extended or adjusted under 35 U.S.C. 154(b) by 710 days.

(21) Appl. No.: 11/114,252

(22) Filed: Apr. 26, 2005

(51) Int. Cl.
*G06Q 40/00* (2006.01)

(52) U.S. Cl. .......................... 705/35; 705/1; 705/36 R; 702/194

(58) Field of Classification Search ................ 702/194; 705/1, 35, 36 R, 194
See application file for complete search history.

(56) References Cited

U.S. PATENT DOCUMENTS

| | | | |
|---|---|---|---|
| 5,361,201 A * | 11/1994 | Jost et al. | 705/35 |
| 5,893,069 A | 4/1999 | White, Jr. | |
| 6,401,070 B1 * | 6/2002 | McManus et al. | 705/1 |
| 6,510,419 B1 | 1/2003 | Gatto | |
| 6,609,109 B1 * | 8/2003 | Bradley et al. | 705/35 |
| 6,609,118 B1 * | 8/2003 | Khedkar et al. | 705/36 R |
| 6,681,211 B1 | 1/2004 | Gatto | |
| 6,842,738 B1 | 1/2005 | Bradley et al. | |
| 6,876,955 B1 * | 4/2005 | Fleming et al. | 702/194 |
| 7,110,970 B2 * | 9/2006 | Dingman et al. | 705/36 R |
| 7,171,383 B2 * | 1/2007 | Johnson et al. | 705/36 R |
| 7,212,995 B2 * | 5/2007 | Schulkins | 705/35 |
| 7,292,994 B2 * | 11/2007 | Prokoski | 705/35 |
| 7,305,328 B1 * | 12/2007 | Fleming et al. | 702/194 |
| 2002/0059126 A1 | 5/2002 | Ricciardi | |
| 2003/0046199 A1 | 3/2003 | Murase et al. | |
| 2003/0078878 A1 | 4/2003 | Opsahl-Ong | |
| 2004/0010443 A1 | 1/2004 | May et al. | |
| 2004/0138975 A1 * | 7/2004 | Engel et al. | 705/35 |
| 2006/0293915 A1 * | 12/2006 | Glenn et al. | 705/1 |

OTHER PUBLICATIONS

Definition of "truncate" (verb) from Merriam-Webster Online Dictionary, 10th Edition. www.merriam-webster.com/dictionary.*
The Magenta Book, Guidance Notes for Policy Evaluation and Analysis, Ch. 4: What do the statistics tell me?, Government Chief Social Researcher's Office, Prime Minister's Strategy Unit, Cabinet Office, Admiralty Arch, The Mall, London. Apr. 2004.*

(Continued)

*Primary Examiner*—James P Trammell
*Assistant Examiner*—B. Joan Amelunxen
(74) *Attorney, Agent, or Firm*—Rader, Fishman & Grauer PLLC (57) ABSTRACT

Confidence scoring entails receipt of a predicted property value for a given property, where the predicted property value is determined based upon application of a property value prediction model. A set of values corresponding to input factors is determined for the property value prediction model, and model parameters are estimated based upon those values. A confidence score for the predicted property value is then calculated using a confidence scoring model and the model parameters. The confidence score is preferably provided as an accuracy probability. This may further be in the form of a probability that the predicted property value has an error within a specified range, such as a specified range expressed in terms of a percentage error.

30 Claims, 6 Drawing Sheets

OTHER PUBLICATIONS

Bradley, M. & Nuetzel, P., "A Standard for AVM Confidence Scores", *Citigroup*, Oct. 17, 2003, pp. 1-6.

Archer, W.R. et al., "Measuring the Importance of Location in House Price Appreciation", *J. of Urban Economics*, vol. 40, 1996, pp. 334-353.

Case, K.E. & Shiller, R.J., "Forecasting Prices and Excess Returns in the Housing Market", *J. of the AREUEA*, 1990, 18(3), pp. 253-273.

Abraham et al., "New Evidence on Home Prices from Freddie Mac Repeat Sales". Journal of the American Real Estate & Urban Economics Association, Fall 1991, vol. 19, Issue 3, pp. 333-352.

Raftery, A. et al., "Model Selection and Accounting for Model Uncertainty in Linear Regression Models", Nov. 19, 1993, U of Washington, pp. 1-24.

Vandell, K.D., "Optimal Comparable Selection and Weighting in Real Property Valuation", AREUEA Journal, vol. 19(2), 1991, pp. 213-239.

Stephens, W. et al. "Conventional Mortgage Home Price Index", J. of Housing Research, vol. 6(3), pp. 389-418.

Case, K.E. & Shiller, R.J., "The Efficiency of the Market for Single-Family Homes", The American Economic Review, vol. 79(1), Mar. 1989, pp. 125-137.

Pace, R.K. & Gilley, O.W., "Appraisal Across Jurisdictions Using Bayesian Estatemation with Bootstrapped Priors for Secondary Mortgage Market Applications", *Prop. Tax J*, Mar. 1989, 8 (1), pp. 27-42.

Gearge W. Gau et al., "Optimal Comparable Selection and Weighting in Real Property Valuation: An Extension" (Journal of the American Real Estate and Urban Economics Association 1992, V20, 1: pp. 107-123.

Sessions, D.N. & Chatterjee, S., "The Combining of Forecasts Using Recrursive Tecniques With Non-Stationary Weights", *J. of Forecasts*, 1989, 8(3), pp. 239-251.

Case, K.E. & Shiller, R.J., "Prices of Single-Family Homes Since 1970: New Indexes for Four Cities", New England Economic Review, Sep./Oct. 1987, pp. 45-46.

Case, B. & Quigley, J.M., "The Dynamics of Real Estate Prices", *Rev. of Econ. & Stats.*, Feb. 1991, 73(1), pp. 50-58.

Quigley, J.M., "A Simple Hybrid Model for Estimating Real Estate Price Indexes", *J. Houseing Econ.*, Mar. 1995,4 (1), pp. 1-12.

Steven Wood "Combining Forecasts to Predict Property Values for Single-Family Residences" Land Economics, May 1976, pp. 221-229.

Case et al., "On Choosing Among House Price Index Methodologies", Journal of the American Real Estate & Urban Economics Association, vol. 19, No. 3,1991, pp. 286-307.

Andrews, R.L.& Ferguson, J.T., "Integrating Judgement with Regression Appraisal",*Real Estate Appraiser and Analyst*, Spring 1986, pp. 71-74.

\* cited by examiner

COLLATERAL VALUATION CONFIDENCE SCORING SYSTEM

BACKGROUND OF THE INVENTION

1. Field of the Invention

This invention relates generally to property value prediction and more particularly to confidence scoring for predicted property values.

2. Description of the Related Art

A confidence score is a quantification of the likelihood that a result is correct or accurate. Typically, a "good" confidence score indicates that a predicted property value is likely to be accurate, and a "bad" confidence score indicates otherwise. The score may be variously provided, including but not limited to percentages, numbers, or ranges.

Confidence scoring systems and corresponding techniques have been developed for predicted property values. A confidence score offers a form of accuracy indication for property values predicted by a collateral assessment or property value prediction (PVP) model. This accuracy indication, together with the predicted property value, is used for mortgage underwriting, post-purchase review of mortgages, and other purposes. Having a reliable indication of accuracy may be as important as having a reliable predicted property value in support of various business operations.

While conventional confidence scoring for property value prediction has been useful, there remains a need for confidence scoring that provides useful results to the user, that integrates well with property value prediction models, and that provides consistently accurate results.

SUMMARY OF THE INVENTION

The present invention provides a confidence scoring system useful for assessing predictions made by property value prediction models.

In one embodiment, confidence scoring entails receipt of a predicted property value for a given property, where the predicted property value is determined based upon application of a property value prediction model. A set of values corresponding to input factors is determined for the property value prediction model, and model parameters are estimated based upon those values. A confidence score for the predicted property value is then calculated using a confidence scoring model and the model parameters.

The confidence scoring model may implement a logistic specification with the model parameters being calculated from the input factors using a maximum log likelihood method.

The confidence score (the result) is preferably provided as an accuracy probability. This may further be in the form of a probability that the predicted property value has an error within a specified range, such as a specified range expressed in terms of a percentage error.

Although it may be implemented in single model applications, the confidence scoring may be applied in the context of a property value prediction system that combines multiple property value prediction models, such as where the predicted property value is determined based upon a weighted combination of property value prediction models.

In one embodiment, the plurality of property value prediction models may include a repeat transactions index model, a tax assessment valuation model, and a property characteristic valuation model.

The present invention can be embodied in various forms, including business processes, computer implemented methods, computer program products, computer systems and networks, user interfaces, application programming interfaces, and the like.

BRIEF DESCRIPTION OF THE DRAWINGS

These and other more detailed and specific features of the present invention are more fully disclosed in the following specification, reference being had to the accompanying drawings, in which.

DETAILED DESCRIPTION OF THE INVENTION

In the following description, for purposes of explanation, numerous details are set forth, such as flowcharts and system configurations, in order to provide an understanding of one or more embodiments of the present invention. However, it is and will be apparent to one skilled in the art that these specific details are not required in order to practice the present invention.

The present invention provides confidence scoring for real property value prediction, as part of a confidence scoring system in one embodiment. The confidence scoring system may operate in conjunction with a property valuation system that implements multiple property value prediction models, produces results with practical meaning, and accounts for the importance of various contributing factors. The confidence scoring system also provides accuracy and more uniform performance across geographic regions.

Figure 1:
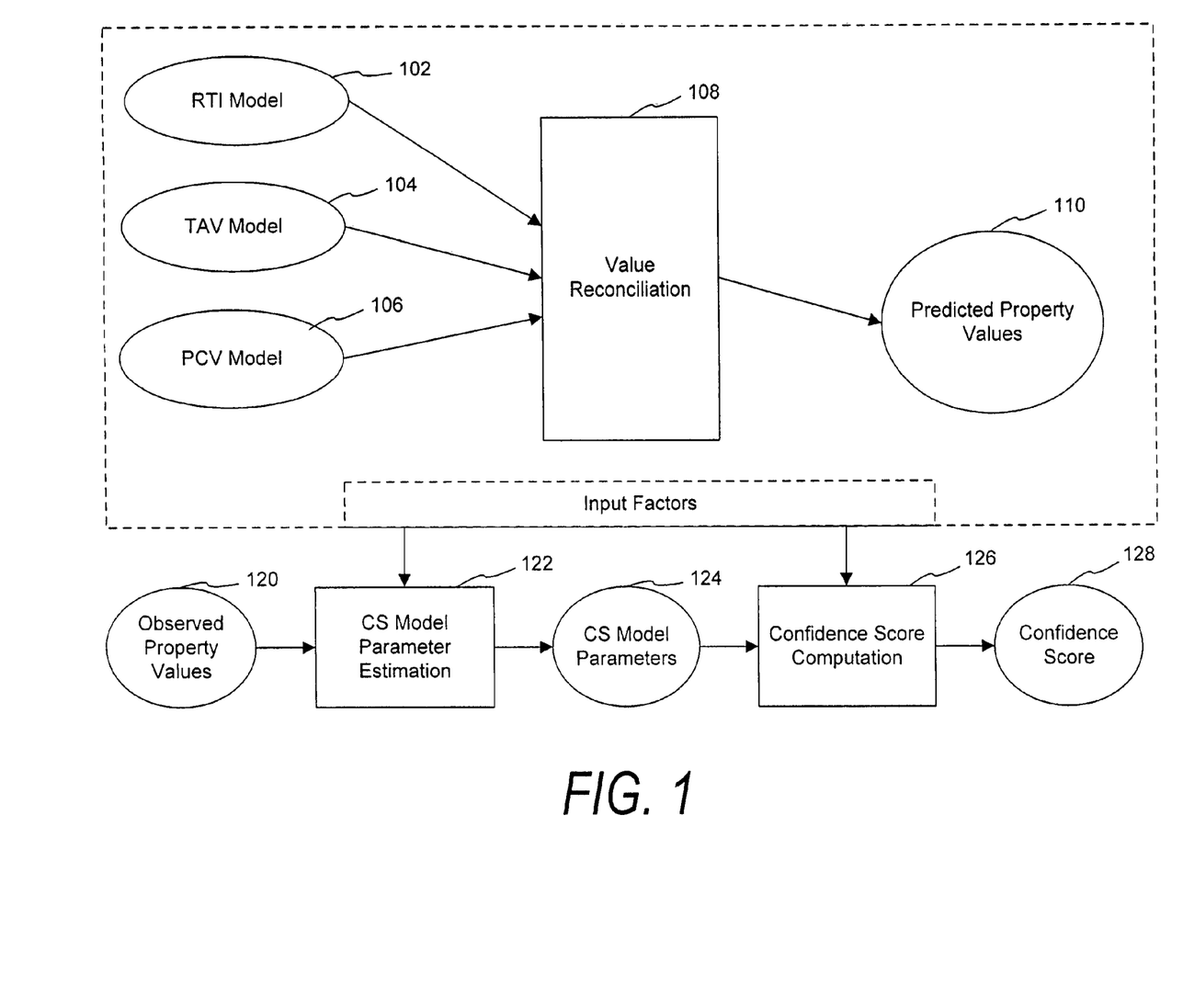
FIG. 1 is a schematic diagram that illustrates confidence scoring corresponding to an example of property value prediction.

Preferably, the confidence scoring system works in conjunction with property value prediction that incorporates a plurality of models, which may be referred to as property value prediction (PVP) models. FIG. 1 is a schematic diagram that illustrates an example of a property value prediction scheme that includes results from multiple models, as well as related confidence scoring. With regard to the property value prediction scheme, a predicated property value may be predicted based upon value reconciliation 108 corresponding to a plurality of PVP models 102, 104, 106.

The present invention is not limited to any particular model or combination of models, but for ease of discussion some specific models are described. The models include a Repeat Transactions Index (RTI) model 102, which uses data on properties with repeat transactions to estimate the house price index, and uses the house price index to predict current property values based on the prior transaction values. A Tax Assessment Valuation (TAV) model 104 uses the tax assessments to predict property prices. Finally, a Property Characteristic Valuation (PCV) model 106 uses information about property characteristics (such as the lot size, living area, etc.) to predict property values.

Some properties will have predicted values from just one model whereas others may have predicted values from multiple models. Value reconciliation 108 accommodates the determination of predicted values corresponding to properties such that each property is uniquely associated with a predicted value in the results. When a property has predicted values from more than one model, a weighted average method may be used to provide a final prediction of the property value. Each model also provides a variance of model residuals for each property. Accordingly, each property in the set of final predicted property values 110 will have an associated variance. Each of the underlying models for property value prediction, or collectively the combination of models, may be referred to as a PVP model. Various techniques for combining models are known, and the present invention is not limited to any particular technique. One example of a technique is described in commonly assigned U.S. Pat. No. 6,876,955, entitled "Method and Apparatus for Predicting and Reporting a Real Estate Value Based upon a Weighted Average of Predicted Values."

FIG. 1 also provides an overview of confidence scoring (120-128) in accordance with an embodiment of the present invention. Various input factors are determined corresponding to individual PVP models and/or combinations of such models. These input factors are used pursuant to confidence score model parameter estimation 122 and confidence score computation 124, as described further below. Particularly, confidence score model parameter estimation 122 receives observed property value data 120 and produces the confidence score model parameters 124 that in turn support confidence score computation 126. The resultant confidence score 128 provides a result from which the user may make assessments about the quality of the predicted property values.

Figure 2:
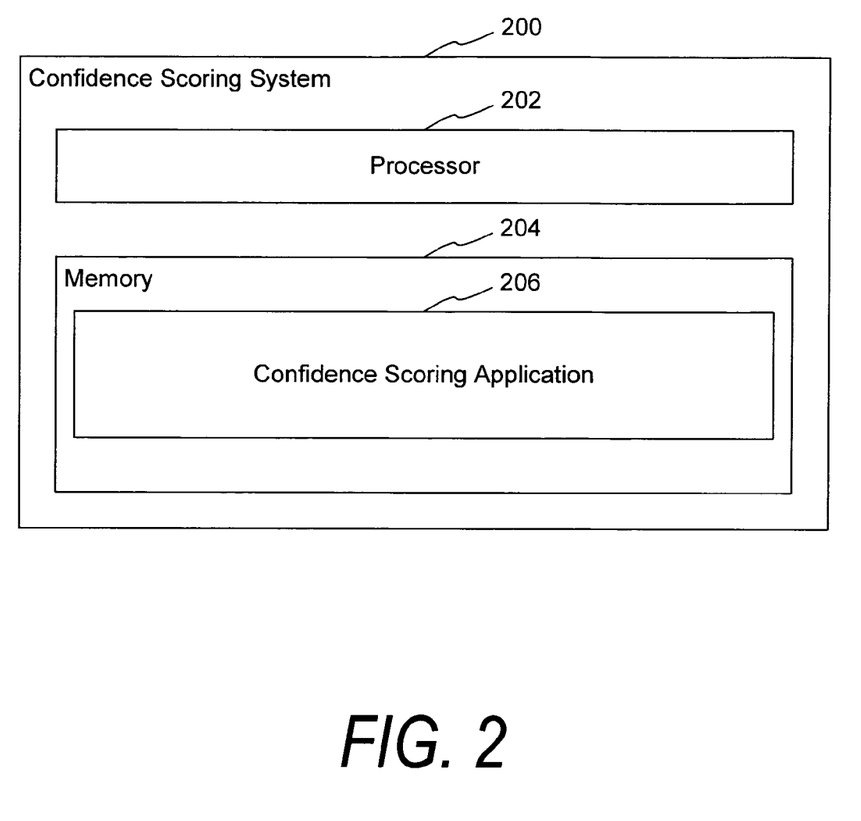
FIG. 2 is a block diagram illustrating an embodiment of a confidence scoring system.

FIG. 2 is a block diagram illustrating an embodiment of a confidence scoring system 200. The confidence scoring system 200 is computer based, and includes a processor 202 and memory 204 that stores a confidence scoring application 206. The confidence scoring application 206 includes instructions that are executed by the processor to perform the functionality described herein and may be variously embodied using conventional programming languages and corresponding programming techniques. Although the confidence scoring application 206 is preferably provided as software, it may alternatively be provided as hardware or firmware, or various combinations of software, hardware and/or firmware.

The confidence scoring system 200, and more particularly the confidence scoring application 206, implements the CS model and provides a result that accommodates an assessment of predicted property values. Particularly, confidence scoring may comprise receiving a predicted property value for a given property based upon a PVP model. For the PVP model, a set of values corresponding to input factors are determined, and confidence scoring model parameters are determined from the set of values. Finally, a confidence score is calculated for the predicted property value using the confidence scoring model and the determined model parameters.

Conventional ranking of predicted property values provides some information but is believed to be lacking. The confidence scoring system 200 provides a result that quantifies the potential for error in any given predicted property value. This is preferably in the form of an accuracy probability. More particularly, the accuracy probability is the probability that the prediction error of a property value lies within a specified range, such as a probability expressed in terms of a percentage error. In one embodiment, the accuracy probability is the probability of a prediction error (pe, in log form) of less than 10%. Although a preferred confidence score takes this form, the confidence score may be variously formulated in accordance with the present invention.

The input factors and corresponding estimation of model parameters and confidence score calculation is now further described. The preferred confidence scoring system 200 uses a CS model that has a logistic specification, such that:

$$\text{Prob}(|pe| < 10\%) = \frac{1}{1 + \exp(-\beta x)}, \quad \text{(Eq. 1)}$$

where x denotes the vector of the input factors, and $\beta$ is the vector of the model parameters to be estimated, such that $\beta x$ represents the aggregated input factor. Preferably, the maximum log likelihood method is used to calculate the model parameters.

Figure 3:
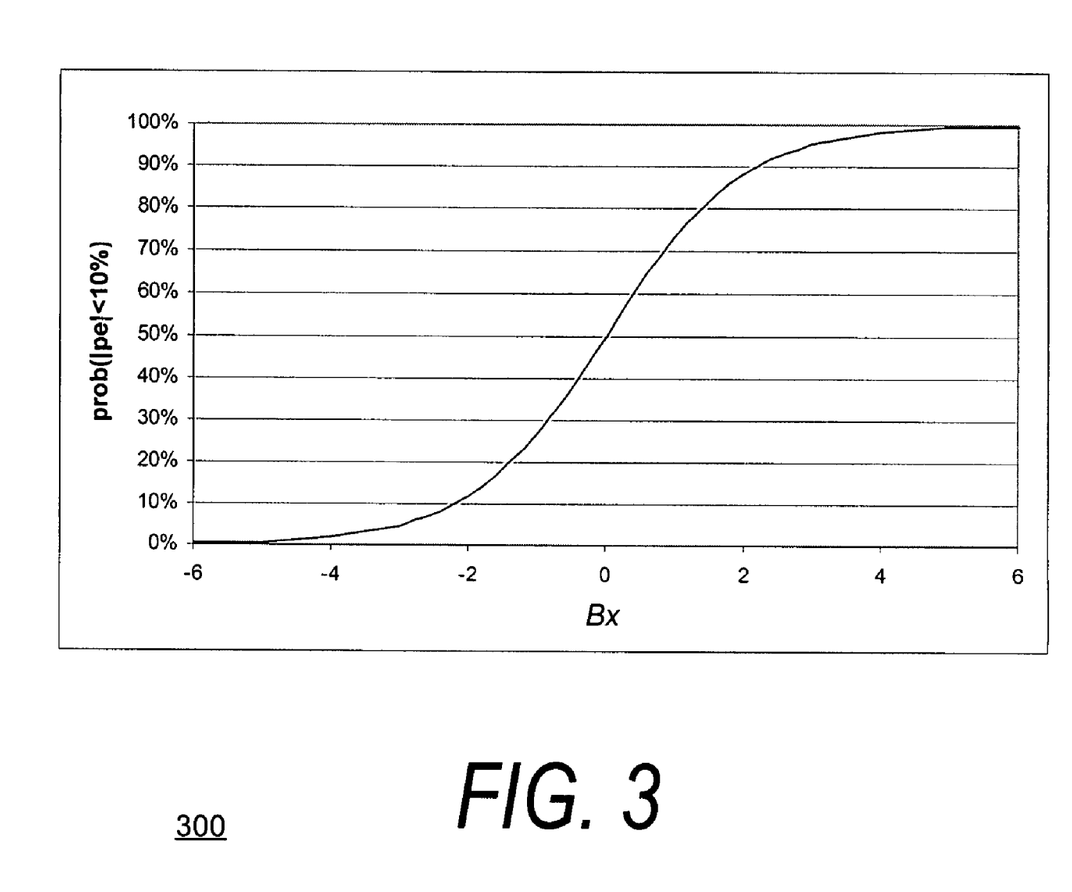
FIG. 3 is a graphical diagram illustrating the behavior of the logistic function that provides the confidence scoring model.

FIG. 3 is a graphical diagram 300 illustrating the behavior of the logistic function underlying the CS model. The graphical diagram 300 illustrates a relationship between the accuracy probability (e.g., the probability that the prediction error is less than 10%) and the aggregated input factor $\beta x$. As is evident from the graph, when $\beta x$ becomes more positive, the accuracy probability becomes larger.

A preferred set of input factors used by the confidence scoring system 200 includes property valuation model uncertainty, the underlying PVP model conformity, data integrity, and neighborhood consistency. Values corresponding to each of these input factors are used to determine model parameters. In the context of the regression model, the model parameters may also be referred to as coefficients. The input factors are described further as follows.

Model uncertainty corresponds to the effect of model residual variance. In one embodiment, the square root of the model residual variance is denoted by $\sigma$, and both $1/\sigma$ and $\sigma$ may be used in the logistic model to account for model uncertainty. The reason for using $1/\sigma$ is that, if the property value prediction model prediction error has a normal distribution and the model residual variance can perfectly reflect the variance of the prediction error, then $1/\sigma$ in the logistic model will more accurately reflect the probability of a prediction error of less than 10% (or any other percentage values). In general, the larger the $\sigma$, the smaller the probability of prediction error less than 10%. Thus the coefficient of $1/\sigma$ will be expected to be positive and the coefficient of $\sigma$ to be negative.

The next input factor is model conformity, which corresponds to the dispersion of predicted property values by the multiple underlying property price prediction models from that of the weighted prediction. Lack of agreement from the three underlying models can indicate the prediction uncertainty. Model conformity may be denoted as mc, and calculated as the square root of dispersion of the three model predictions from the weighted prediction (in log form) to measure the model conformity. The coefficient of mc in logistic regression is expected to be negative.

Data integrity corresponds to the effect of data reliability. A large possibility of data error entails less confidence in the predicted property values. For the RTI model, if the difference of the two predictions based on the most recent two prior transactions is large, then the possibility of data error is assumed to be large. The difference between these two RTI predictions (in log form, denoted as di) and its absolute value (denoted by |di|) may be used to proxy the data integrity. The coefficient of |di| in the logistic regression is expected to be negative, while the coefficient of di can be positive or negative. If a property only has one RTI prediction based on one prior transaction, then di will be set to zero and a dummy variable will be used to indicate such is the case.

Typically, other types of models may not have a data integrity determination, as only one set of data is present for any given property. However, when data integrity can be calculated from more than one PVP model, something such as the average of data integrity from the relevant PVP models may be used.

Neighborhood consistency corresponds to the effect of the consistency of a property's predicted value with that of the neighborhood. In general, the larger the deviation of the predicted property price from that of the neighborhood median, the more likely that the predicted property price is less accurate. The deviation of the predicted property price from the neighborhood median property price is used as the factor that impacts the prediction accuracy. In denoting the deviation from the neighborhood median as nb and its absolute value as |nb|, and using both in the logistic model, the coefficient of |nb| is expected to be negative while the coefficient of nb can be either positive or negative.

Although some preferred input factors are discussed, the present invention is not necessarily so limited and may use alternative input factors or additional ones. For example, a dummy variable may be used to indicate single family or condo properties because they are expected to behave differently. This may be referred to as a "condo dummy" variable (cd). It might be desirable to run the condo confidence scoring model separately from that of single family. However, there may not be a sufficient number of condo observations to estimate a separate set of reliable model parameters. These and other input factors may be included as desired.

The confidence scoring system 200 may also implement techniques to refine the determination of accuracy probabilities, such as rescaling and truncation. Referring again to the graphical diagram 300 of FIG. 3, when the predicted probability of |pe|<10% reaches the two extremes (very low and high probability), the realized probability does not follow the predicted probability to the extreme values. This is observed as being more prevalent at the lower end of predicted probability.

The cause of this is believed to be the model's inability to accommodate the tail end of the input factors. In order to make the model fit the tail end of the input factors and produce a predicted probability that is more in line with the realized probability, two techniques are employed. The first is the rescaling of the aggregated input factor in the logistic model, and the second is the truncation of model probability. Implementation of these techniques is as follows.

The aggregated input factor in the logistic model is $\beta x$. To rescale it, an arctangent function is used to transform it into:

$y=b_1 \arctan(\beta x/b_1)$ if $\beta x<0$, and $y=b_2 \arctan(\beta x/b_2)$ if $\beta x>0$. (Eq. 2)

Figure 4:
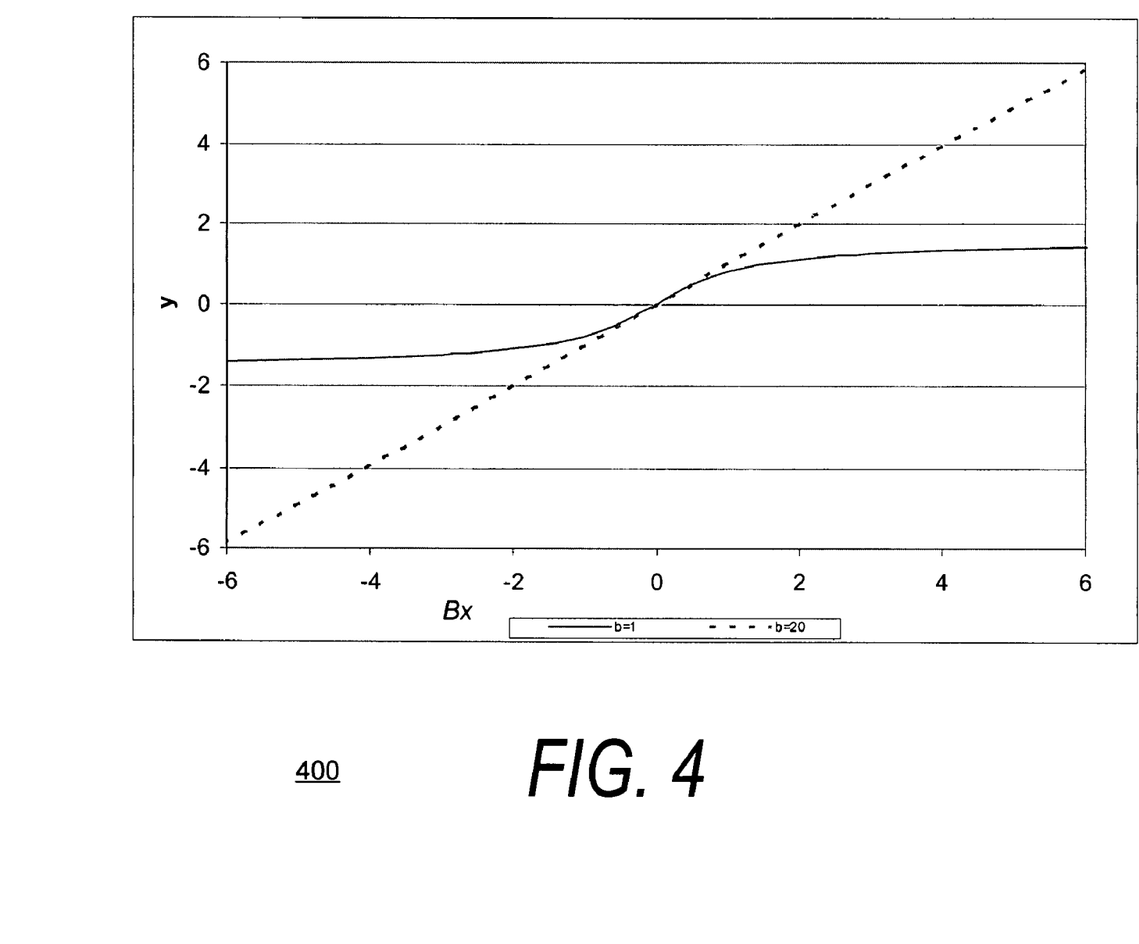
FIG. 4 is a graphical diagram illustrating resealing of an aggregated input factor used by the confidence scoring model.

The y variable is then used in Eq. 1 in place $\beta x$. The degree of rescaling is determined by the b parameter. Separate scaling factors for cases where $\beta x<0$ and $\beta x>0$ may be used to accommodate different degrees of rescaling treatment. A smaller b parameter results in more rescaling of the aggregated input factor. FIG. 4 is a graphical diagram 400 that illustrates this, particularly illustrating the resulting values for the y variable for various $\beta x$ values, presuming different degrees of rescaling (b=1, b=20). As is evident, significant rescaling occurs where b=1, and little where b=20.

Figure 5:
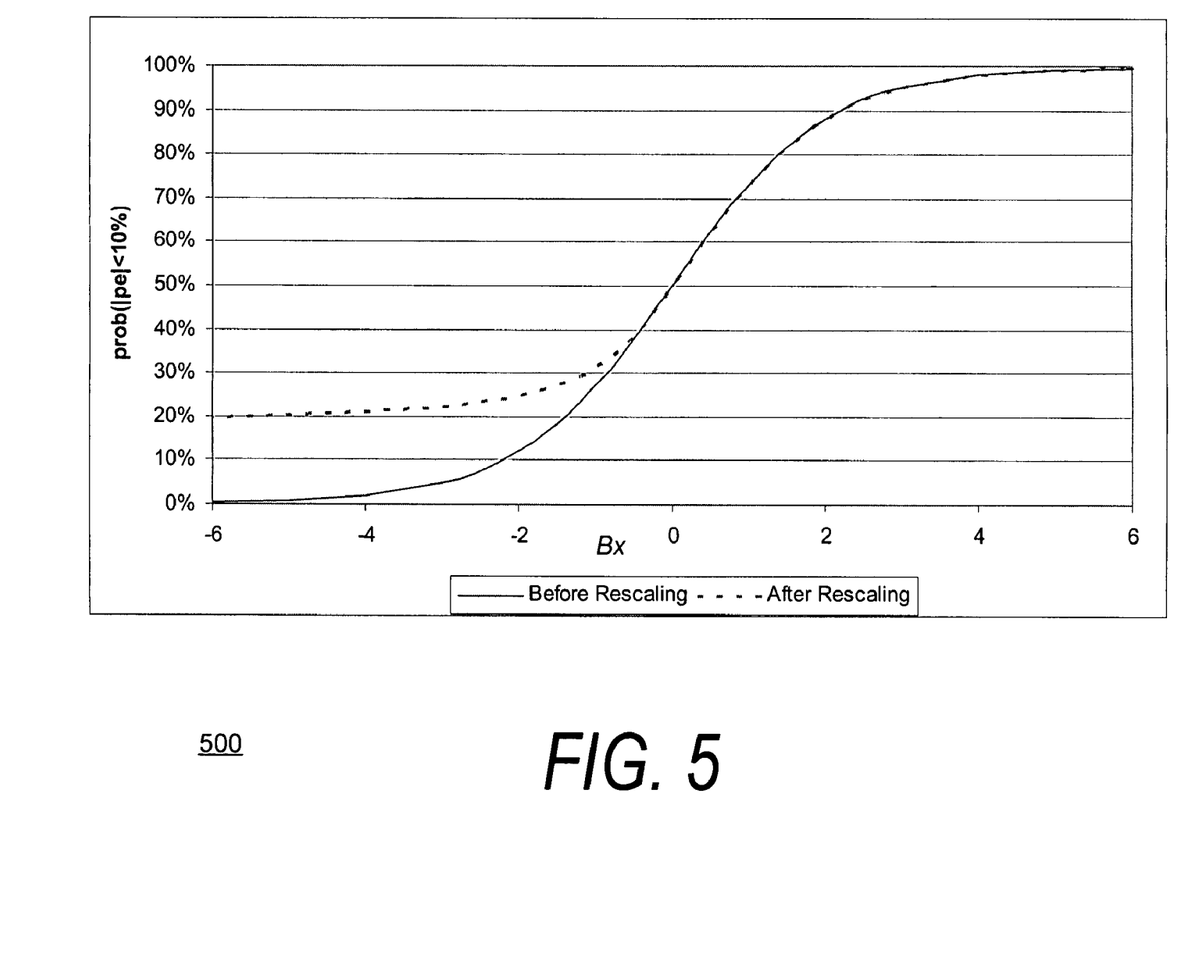
FIG. 5 is a graphical diagram illustrating accuracy probability as a function of the aggregated input factor with separate scaling factors.

FIG. 5 illustrates a graphical diagram 500 illustrating the accuracy probability as a function of the aggregated input factor with separate scaling factors being applied to the high and low end of the scale. Particularly, the effect of rescaling on the logistic function with $b_1=1$ and $b_2=20$ is illustrated, with the values before and after rescaling.

As described, the refinement techniques may also include truncation. The truncation of accuracy probability results may be provided according to the following equations:

$$\frac{1}{1+\exp(-y)} = 0.15 \text{ if } \frac{1}{1+\exp(-y)} < 0.15, \text{ and} \quad \text{(Eq. 3)}$$

$$\frac{1}{1+\exp(-y)} = 0.85 \text{ if } \frac{1}{1+\exp(-y)} > 0.85.$$

This effectively restricts the predicted probability to a range of 15% to 85%. The rescaling and truncation steps are done during the model estimation process, where $b_1$ and $b_2$ are estimated. The model parameters are estimated by using the maximum likelihood method. The resultant accuracy probability estimation is expressed as:

$$Prob(|pe|<10\%) = f(\beta x) = \frac{1}{1+\exp(-b_1 \arctan(\beta x/b_1))}, \quad \text{(Eq. 4)}$$
$$\text{if } \beta x < 0$$
$$= \frac{1}{1+\exp(-b_2 \arctan(\beta x/b_2))},$$
$$\text{if } \beta x > 0$$
$$= 0.15 \text{ if } f(\beta x) < 0.15$$
$$= 0.85 \text{ if } f(\beta x) > 0.85$$

Figure 6:
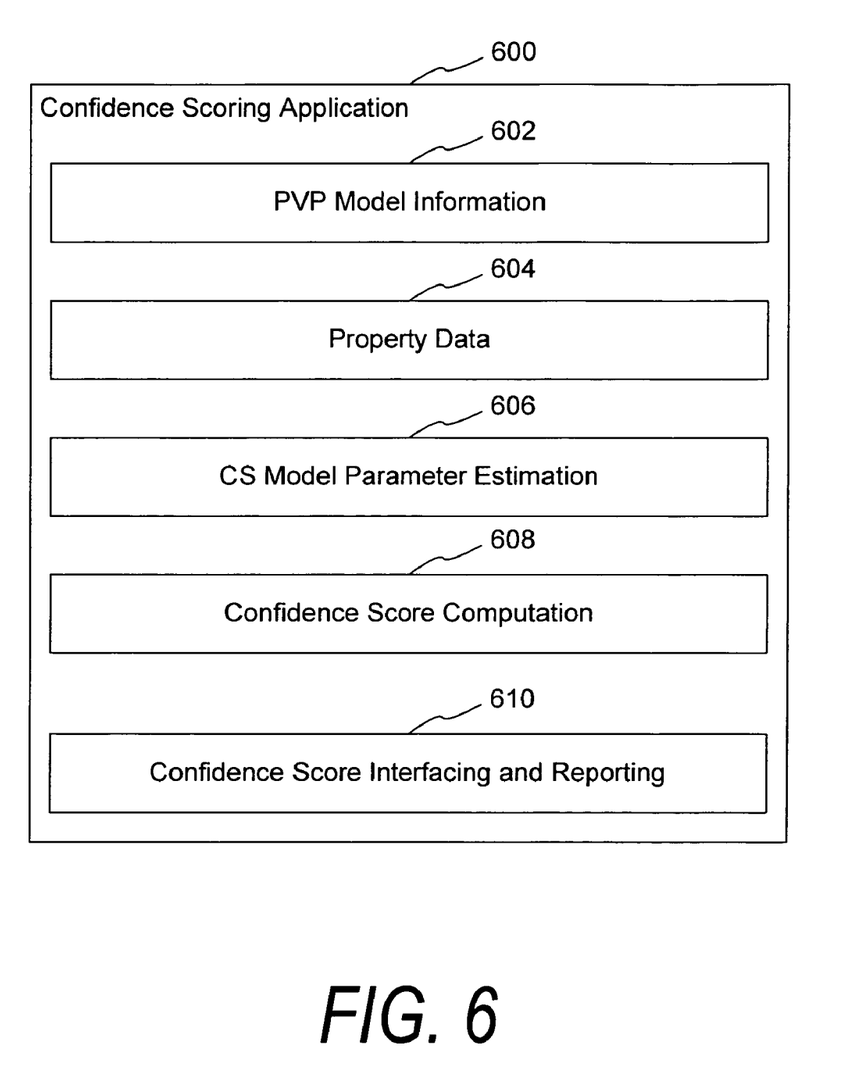
FIG. 6 is a block diagram illustrating another embodiment of a confidence scoring application.

FIG. 6 is a block diagram illustrating an embodiment of a confidence scoring application 600 in more detail. As with the embodiment of FIG. 2, the confidence scoring application 600 is preferably software. Although one modular breakdown is illustrated, it should be understood that the described functionality may be provided by fewer, greater, or differently named modules. The confidence scoring application 600 may be provided for implementation in various computing environments such as a desktop application or a service that is provided online.

The confidence scoring application 600 includes PVP model information 602, property data 604, CS model parameter estimation 606, confidence score computation 608 and confidence score interfacing and reporting 610 modules.

The property data module 604 includes information about predicted property values. It may be organized as a database in conventional fashion, with information that accommodates an identification of the property to further unique association of records to properties. The property data module 604 may be variously populated, such as by collection of data, importation of the entire database, aggregation of data from multiple sources, or combinations thereof.

The PVP model information module 602 includes information corresponding to the PVP models that are used to produce predicted property values alone or in combination, including but not limited to the above described PVP models and the techniques for combining such models such as in weighted fashion. The input factors are thereby accessible by the CS model parameter estimation module 606 which identifies the input factors and performs corresponding estimation of the CS model parameters such as described above.

The confidence score computation module 608 is in communication with the CS model parameter estimation module 606, as well as the PVP model information module 602 and thus accesses the CS model parameters as well as the input factors corresponding to any given property value estimation. The confidence score is determined using the CS model and these values as described in the equations above. The confidence score may be in the form of an accuracy probability, such as the probability that the prediction error of a property value lies within a specified range, as described. For example, the accuracy probability may be the probability of a prediction error (in log form) of less than 10%.

The results of the confidence scoring model may be estimated and tested using an existing database of property data. It is desirable to remove systematic biases from the database prior to application of the confidence scoring model, since the model is preferably a measure of the uncertainty in predicted property values rather than a prediction of bias for various reasons (e.g., time lag in the property data, transaction type bias, etc.).

It is preferable to divide the properties into different groups according to the availability of the property value prediction (PVP) models and estimate separate confidence score model for each group of properties. There are two rationales for the grouping of properties. First, the input factors available in the confidence score model for each group can be different. Second, the distribution of the input factors also can be different. This means that for a three model embodiment seven CS models are estimated. Preferably, the model parameters for the confidence scoring models are estimated by the maximum log likelihood method.

If there are various types of properties, such as single family and condo properties, it may be desirable to run a separate model for each type of property. However, if the condo properties (or any determined "type") are in such small numbers that a separate model cannot be reliably estimated, then techniques such as a dummy variable to distinguish such properties may be used.

Accordingly, each dataset group and each type of property can have different corresponding sets of confidence score parameters. The computation of confidence score uses the relevant set of confidence score parameters for a given property.

To demonstrate, the input factors for three groups of properties are listed in Table 1. For group 1, because the properties only have one PVP model prediction, there is no model conformity for such properties. Thus, the input factors of the confidence score model for the properties in this group do not include the model conformity measure (mc). Consequently, the confidence score model parameter of mc for the properties in this group will not be estimated. Also, some properties do not have data integrity (di) measure. The dummy variable for di takes the values of 0 if di is available, and takes the value of 1 if di is unavailable. The example list of input factors for the confidence score model are thus summarized in Table 1.

TABLE 1

List of Input Factors for CS Model

| Input Factors (x) | Group 1: Properties valued by PVP Model 1 only | Group 2: Properties valued by PVP Model 1 & 2 only | Group 3: Properties valued by PVP Model 1, 2 & 3 |
|---|---|---|---|
| Constant | ✓ | ✓ | ✓ |
| $1/\sigma$ | ✓ | ✓ | ✓ |
| $\sigma$ | ✓ | ✓ | ✓ |
| $|di|$ | ✓ | ✓ | ✓ |
| Di | ✓ | ✓ | ✓ |
| Dummy for di * | ✓ | ✓ | ✓ |
| mc | | ✓ | ✓ |
| $|nb|$ | ✓ | ✓ | ✓ |
| Nb | ✓ | ✓ | ✓ |
| Cd | ✓ | ✓ | ✓ |
| $B_1$ | ✓ | ✓ | ✓ |
| $B_2$ | ✓ | ✓ | ✓ |

The confidence score computed by the described method indicates the likelihood of the predicted property value is within the 10% range of the true property value. However, if a practitioner chooses to use other measures of accuracy of the prediction, such as the standard deviation (or the dispersion) of the prediction from the true property value, then the confidence score can be easily converted to such a measure.

Conversion of the confidence score to other measures of accuracy may be accommodated by a simple calibration process. For example, one can utilize the property dataset used in the confidence score model parameter estimation step, group the properties in the dataset by the confidence score (such as 0.15 to 0.25 group, 0.25 to 0.35 group, etc.), and compute the standard deviation of the prediction error for each group. This information may then be used to build a look up table mapping confidence score to standard deviation of prediction. This allows the user to review the standard deviation of the predicted property value for any property for which the confidence score is determined.

Thus embodiments of the present invention produce and provide real property pricing confidence scoring. Although the present invention has been described in considerable detail with reference to certain embodiments thereof, the invention may be variously embodied without departing from the spirit or scope of the invention. Therefore, the following claims should not be limited to the description of the embodiments contained herein in any way.

The invention claimed is:

1. A computer implemented method for confidence scoring of predicted property values, the method comprising:
   receiving a predicted property value for a given property, the predicted property value being determined by a computer based upon application of a plurality of property value prediction models, wherein the predicted property value is determined as a weighted combination of the plurality of property value prediction models;
   determining a set of values corresponding to input factors for each of the plurality of property value prediction models;
   determining, by the computer, a set of model parameters for a confidence scoring model based upon the set of values; and
   automatically calculating, by the computer, a confidence score for the predicted property value, the predicted property value being separately determined as the weighted combination of the plurality of property value prediction models, by using the confidence scoring model and the determined set of model parameters, wherein calculating the confidence score implements a logistic regression that provides an accuracy probability as a function of the set of values and the model parameters.

2. The method of claim 1, wherein the accuracy probability is a probability that the predicted property value has an error with a specified range.

3. The method of claim 2, wherein the specified range is expressed in terms of a percentage error.

4. The method of claim 1, wherein the plurality of property value prediction models include a repeat transactions index model, a tax assessment valuation model, and a property characteristic valuation model.

5. The method of claim 1, wherein the set of model parameters are determined using a maximum log likelihood method.

6. The method of claim 1, wherein the input factors include one or more of property valuation model uncertainty, model conformity, data integrity, and neighborhood consistency.

7. The method of claim 1, wherein the input factors include property valuation model uncertainty, which is determined by measuring the property value prediction model residual variance.

8. The method of claim 7, wherein the input factors include model conformity, which is determined by measuring the dispersion of predicted property values from values predicted by multiple property value prediction models.

9. The method of claim 8, wherein the input factors include data integrity, which is determined by measuring the discrepancy of data used in the property value prediction model.

10. The method of claim 9, wherein the input factors include neighborhood consistency, which is determined by measuring the deviation of the predicted property value from a neighborhood median property value.

11. The method of claim 1, further comprising:
rescaling an aggregate input factor of the confidence scoring model; and
adjusting the confidence scoring model calculation to truncate the calculated accuracy probability, wherein rescaling the aggregate input factor and adjusting the confidence score accommodate a correlation of the confidence scoring model with observed data.

12. An apparatus for confidence scoring of predicted property values, the apparatus comprising:
means for receiving a predicted property value for a given property, the predicted property value being determined based upon application of a plurality of property value prediction models, wherein the predicted property value is determined as a weighted combination of the plurality of property value prediction models;
means for determining a set of values corresponding to input factors for each of the plurality of property value prediction models;
means for determining a set of model parameters for a confidence scoring model based upon the set of values; and
means for calculating a confidence score for the predicted property value, the predicted property value being separately determined as the weighted combination of the plurality of property value prediction models, using the confidence scoring model and the determined set of model parameters, wherein calculating the confidence score implements a logistic regression that provides an accuracy probability as a function of the set of values and the model parameters.

13. The apparatus of claim 12, wherein the accuracy probability is a probability that the predicted property value has an error within a specified range.

14. The apparatus of claim 13, wherein the specified range is expressed in terms of a percentage error.

15. The apparatus of claim 12, wherein the plurality of property value prediction models include a repeat transactions index model, a tax assessment valuation model, and a property characteristic valuation model.

16. The apparatus of claim 12, wherein the set of model parameters are determined using a maximum log likelihood method.

17. A system for confidence scoring of predicted property values, the system comprising:
a PVP model information module, which determines a set of values corresponding to input factors for each of a plurality of property value prediction models;
a model parameters estimation module, in communication with the PVP model information module, which receives a predicted property value for a given property, the predicted property value being determined based upon application of the plurality of property value prediction models, wherein the predicted property value is determined as a weighted combination of the plurality of property value prediction models, and which determines a set of model parameters for a confidence scoring model based upon the set of values; and
a confidence score computation module, in communication with the model parameters estimation module, which calculates a confidence score for the predicted property value that is separately determined as the weighted combination of the plurality of property value prediction models, using the confidence scoring model and the determined set of model parameters, wherein calculating the confidence score implements a logistic regression that provides an accuracy probability as a function of the set of values and the model parameters wherein each module is encoded in a computer readable medium.

18. The system of claim 17, wherein the plurality of property value prediction models include a repeat transactions index model, a tax assessment valuation model, and a property characteristic valuation model.

19. The system of claim 17, wherein the set of model parameters are determined using a maximum log likelihood method.

20. A computer program product for confidence scoring of predicted property values, the computer program product comprising a computer readable storage medium having stored thereon program code, which when executed by a computer provides operations comprising:
receiving a predicted property value for a given property, the predicted property value being determined based upon application of a plurality of property value prediction models, wherein the predicted property value is determined as a weighted combination of the plurality of property value prediction models;
determining a set of values corresponding to input factors for each of the plurality of property value prediction models;
determining a set of model parameters for a confidence scoring model based upon the set of values; and
calculating a confidence score for the predicted property value, the predicted property value being separately determined as the weighted combination of the plurality of property value prediction models, by using the confidence scoring model and the determined set of model parameters, wherein calculating the confidence score implements a logistic regression that provides an accuracy probability as a function of the set of values and the model parameters.

21. The computer program product of claim 20, wherein the accuracy probability is a probability that the predicted property value has an error within a specified range.

22. The computer program product of claim 21, wherein the specified range is expressed in terms of a percentage error.

23. The computer program product of claim 20, wherein the plurality of property value prediction models include a repeat transactions index model, a tax assessment valuation model, and a property characteristic valuation model.

24. The computer program product of claim 20, wherein the set of model parameters are determined using a maximum log likelihood method.

25. The computer program product of claim 20, wherein the input factors include one or more of property valuation model uncertainty, model conformity, data integrity, and neighborhood consistency.

26. The computer program product of claim 20, wherein the input factors include property valuation model uncertainty, which is determined by measuring the property value prediction model residual variance.

27. The computer program product of claim 26, wherein the input factors include model conformity, which is determined by measuring the dispersion of predicted property values from values predicted by multiple property value prediction models.

28. The computer program product of claim 27, wherein the input factors include data integrity, which is determined by measuring the discrepancy of data used in the property value prediction model.

29. The computer program product of claim 28, wherein the input factors include neighborhood consistency, which is determined by measuring the deviation of the predicted property value from a neighborhood median property value.

30. The computer program product of claim 20, further comprising:
  rescaling an aggregate input factor of the confidence scoring model; and
  adjusting the confidence scoring model calculation to truncate the calculated accuracy probability, wherein rescaling the aggregate input factor and adjusting the confidence score accommodate a correlation of the confidence scoring model with observed data.

* * * * *